(12) United States Patent
Goerg

(10) Patent No.: US 6,508,851 B2
(45) Date of Patent: Jan. 21, 2003

(54) HOUSING FOR HOLDING A FILTER CARTRIDGE HAVING A DEFORMABLE SEAL ARRANGED WITHIN A JOINT BETWEEN A HOUSING SHELL AND COVER

(75) Inventor: Guenter Goerg, Moeglingen (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/876,776

(22) Filed: Jun. 8, 2001

(65) Prior Publication Data

US 2002/0020156 A1 Feb. 21, 2002

Related U.S. Application Data

(63) Continuation of application No. PCT/EP99/09581, filed on Dec. 7, 1999.

(30) Foreign Application Priority Data

Dec. 8, 1998 (DE) .......................................... 198 56 520

(51) Int. Cl.⁷ .......................... B01D 27/08; B01D 35/14
(52) U.S. Cl. .......................... 55/385.3; 55/497; 55/502; 55/500; 55/503
(58) Field of Search .......................... 55/497, 498, 500, 55/502, 503, 385.3

(56) References Cited

U.S. PATENT DOCUMENTS

| 2,135,863 | A |   | 11/1938 | Walker |
| 5,222,488 | A | * | 6/1993  | Forsgren ................. 128/201.25 |
| 5,674,302 | A | * | 10/1997 | Nakayama et al. ...... 210/493.1 |
| 5,853,577 | A | * | 12/1998 | Gizowski et al. .......... 156/73.5 |

FOREIGN PATENT DOCUMENTS

| EP | 0490169 B2 | 6/1992 |
| FR | 2752172 | 2/1998 |

OTHER PUBLICATIONS

International Search Report.

* cited by examiner

Primary Examiner—Robert A. Hopkins
(74) Attorney, Agent, or Firm—Crowell & Moring LLP

(57) ABSTRACT

A filter including a housing with a bottom shell (11) and a cover (13) for receiving a filter element (10). The filter element has a seal (17) that is made of non-woven material and is also used as a filtering medium. The filter element is clamped in a slot (16) between clamping ribs (20) and clamping grooves (21). Manufacturing tolerances of the housing parts can thus be compensated over a wide range. This leads to improved economic efficiency in the manufacturing process, especially as regards the production of synthetic resin housings. In addition, the assembly and retaining forces acting between the parts of the housing can be reduced, thereby simplifying the assembly process.

14 Claims, 2 Drawing Sheets

HOUSING FOR HOLDING A FILTER CARTRIDGE HAVING A DEFORMABLE SEAL ARRANGED WITHIN A JOINT BETWEEN A HOUSING SHELL AND COVER

CROSS REFERENCE TO RELATED APPLICATIONS

This application is a continuation of international application no. PCT/EP99/09581, filed Dec. 7, 1999, the entire disclosure of which is incorporated herein by reference.

FIELD OF THE INVENTION

The present invention relates to a filter, particularly an air filter for the combustion air of internal combustion engines, in which a filter cartridge is used in such a way that it provides the seal for the housing shells. Further, the invention relates to a sealed housing comprising at least two housing shells, and to filter cartridges suitable for installation in the aforementioned filter.

BACKGROUND OF THE INVENTION

EP 490 169 B2 discloses a filter having a housing consisting of two housing shells in accordance with FIG. 3. To install the filter cartridge, the housing is opened and the filter cartridge is inserted into a housing shell in such a way that a seal attached to the edge of the filter cartridge extends into the flanged joint between the housing shells. The housing shells are then reassembled. This fixes the filter cartridge within the housing on the one hand and produces a seal in the flange on the other hand. The sealing effect is enhanced in that a bead with a corresponding groove is provided in the flanged joint, which causes an additional deformation of the seal in the area of the flange.

A housing seal designed in the above manner, however, causes production-related problems. The flanged joint is formed by a circumferential sealing surface around the housing wall, which must correspond to an opposite surface in the other housing part. The dimension of the seal attached to the filter cartridge is small as viewed in joining direction. As a result, the housing parts must be manufactured with great precision since even minor deviations in shape, e.g., due to warping of the components, would cause the sealing gap to gape open. This would cause dirt to reach the filtered side of the filter through the secondary air intake, which must be avoided in any case. Particularly if the housing parts are made of plastic, which is currently the standard material for air filter housings, warping of the housing parts is very substantial. To obtain a reliable seal, a plurality of fastening means must therefore be provided in the area of the flange, which in combination produce sufficient pressure. But this involves increased complexity in assembly or during filter replacement.

Further, EP 490 169 B2 proposes to provide an additional seal in one of the housing parts or to fix it to the seal located on the filter cartridge. This involves the drawback of additional complexity either due to an additional production step for the filter cartridge or during final assembly for handling the additional seal. In other respects, although the seal increases the tolerance range in the flanged joint, it only lessens the problem discussed above. The seal can only have a limited dimension in joining direction of the housing parts. If this dimension is selected too large, the assembly forces increase again in the areas of narrow gaps in the flanged joint. These are the very assembly forces that the measure is intended to reduce.

SUMMARY OF THE INVENTION

It is an object of the invention to provide a housing consisting of at least two shells, which satisfies the requirements for a tight seal, can be produced cost-effectively, and involves little complexity in assembly.

Another object of the invention is to provide a filter housing for a filter cartridge which housing seals tightly, can be produced at reasonable cost, and is not unduly complex to assemble.

A further object of the invention is to provide a filter cartridge which can be used in a filter housing meeting the above requirements.

In accordance with one aspect of the invention, the objects are achieved by providing a housing comprising a housing shell and a cover, wherein a seal is at least partially made of a flat material deformable by mounting forces of the cover which is inserted into a joint between the housing shell and the cover so as to seal the joint; the seal being pressed into at least one clamping groove provided in one of the shell and cover of the housing by at least one clamping rib formed on the other of the shell and cover and extending substantially parallel to the housing wall; the at least one clamping rib having a pressure edge in contact with one side of the seal, and the opposite side of the seal in the area of the pressure edge projecting into a hollow space formed by the clamping groove; the clamping groove being sufficiently deep that the seal does not contact the groove bottom.

In accordance with another aspect of the invention, the objects are achieved by providing a filter comprising a housing shell and a cover, the shell and cover fixing a filter cartridge interiorly of the housing such that the filter cartridge separates an unfiltered side provided with a housing inlet from a filtered side provided with a housing outlet, wherein a seal at least partially made of a flat material deformable by mounting forces of the cover on the shell is arranged on the filter cartridge such that it extends into a joint between the housing shell and the cover so as to seal the joint, the seal being pressed into at least one clamping groove provided in one of the shell and cover by at least one clamping rib formed on the other of the shell and cover and extending substantially parallel to the housing wall, the at least one clamping rib having a pressure edge in contact with one side of the seal and the opposite side of the seal in the area of the pressure edge projecting into a hollow space formed by the clamping groove, the clamping groove being sufficiently deep that the seal does not touch the groove bottom.

In accordance with a further aspect of the invention, the objects are achieved by providing a filter cartridge for installation in a filter as described above in which a seal of the filter cartridge within a tolerance range always contacts the pressure edges of the clamping ribs within a joint of the filter housing, irrespective of any shape deviations of the filter housing.

The filter according to the invention comprises two housing parts suitable for receiving a filter cartridge within the housing interior. The unfiltered side of the filter is separated from the filtered side by a seal affixed on the filter cartridge, which extends into the joint between the housing parts. When the housing parts are assembled, the sealing effect is produced by the seal fixed to the filter cartridge. With respect to final assembly, the filter can thus be constructed of three parts if, for instance, snap connections are provided as assembly means on the flanged joint between the housing parts. This makes it possible to minimize the time required to assemble the filter according to the invention.

To enhance the sealing effect, at least one clamping groove is formed in the area of the joint in one of the housing parts, into which a clamping rib of the other housing part extends after assembly is complete. The seal is made of an elastically deformable material, so that it is pressed into the clamping groove by the clamping rib. The seal fits tightly against the pressure edge of the clamping rib, while the clamping groove is made sufficiently deep that the seal does not touch the groove bottom. The pressure on the seal required to seal the joint is thus primarily produced by a flexural deformation of the seal along the pressure edges of the clamping ribs and not by compression of the seal itself. This significantly reduces the amount of the sealing force that must be applied to the seal. Due to the small dimensions of the sealing surface in the form of pressure edges of the clamping rib, a pressure force that is sufficiently large overall is applied to the seal.

The configuration of the seal system has the advantage, on the one hand, of substantially reducing the holding forces that must be applied by the connecting means between the housing shells. This increases the economic efficiency of the filter, e.g., by reducing the required number of assembly screws. However, the essential advantage afforded by the seal configuration according to the invention is that it allows for a wide tolerance range in the housing parts. This tolerance range results from the depth of the clamping groove. The height of the clamping ribs is selected in such a way that the ribs extend into the clamping groove to some extent if there are no shape deviations in the housing parts. Any shape deviations then cause a variation in the depth by which the clamping ribs extend into the clamping grooves. Irrespective thereof, the seal always fits against the pressure edges of the clamping ribs within the tolerance range, and the holding force between the two housing parts varies only insignificantly. The limits of the tolerance range are given on the one hand by the upper edges of the clamping groove and on the other hand by the groove bottom of the clamping groove. In the latter case, therefore, the seal may in addition be plastically deformed in a borderline case if the pressure edges of the clamping rib extend all the way to the groove bottom of the clamping groove due to component tolerances.

Advantageously the seal can be made of a fibrous nonwoven material. Particularly suitable are thermoplastic fibers, which permit thermal disposal of the filter cartridge. The use of the nonwoven material as a seal has the further advantage that the nonwoven material can in part be plastically deformed if there is a large overlap between the clamping groove and the clamping ribs. This occurs due to a stretching of the fiber structure or a sliding of the individual nonwoven fibers next to one another. As a result, the pressure forces that occur when the seal is deformed can be kept below a certain amount, so that the forces that are required to assemble the two sealing shells are further reduced.

The use of a nonwoven material for the seal produces a seal system, which is supported against the pressure edges of the clamping ribs as described above. This creates a seal geometry comparable to a labyrinth seal in which air permeability of the seal may be deliberately accepted. In this case, the nonwoven sealing material acts like a filter element in that secondary air flows through it. An unfiltered secondary airflow is not possible since the nonwoven seal is supported against the pressure edges of the clamping ribs. To assure the required air purity on the filtered side of the filter, the filter fineness of the nonwoven seal or its separation efficiency must be at least as high as that of the filter cartridge.

During use, the nonwoven seal can become clogged with separated particles, which reduces the secondary airflow but does not impair the functioning of the filter in any way.

According to one advantageous embodiment of the inventive concept, a plurality of clamping ribs is provided in the joint. The clamping grooves can be formed, respectively, by the gaps between two clamping ribs. Thus, the groove edges simultaneously form the pressure edges of the clamping ribs. This enhances the sealing effect of the seal. Due to the functional integration of clamping grooves and clamping ribs, the required space for the joint is kept within limits.

An advantageous embodiment of the invention provides means for interlocking the seals along the seal edges. These means can be teeth that dig into the sealing material, particularly in the case of a nonwoven seal. This prevents the seal from slipping out. The teeth can be molded onto the pressure edges of the clamping ribs. Alternatively, other interlocking means may be provided, e.g., burls. It is also feasible to make the pressure edges of a non-slip material, which is for instance injection molded onto the housing parts in a multicomponent technique.

A modification of the invention provides that the seal be simultaneously used as a means to fix the filter cartridge within the housing interior. This saves additional support surfaces for the filter element along the inner walls of the housing and thereby creates additional latitude regarding tolerances in the configuration of the housing and the filter cartridge. Such a design of the filter cartridge in combination with the interlocking means provided in the joint furthermore makes it possible to eliminate an end fold reinforcement on the filter cartridge. Such reinforcements are generally necessary if the filter element is supported against the housing wall to produce a seal.

The design of the joint between the housing parts can alternatively be used for any type of housing, particularly in the intake tract of an internal combustion engine. For the seal, a fibrous nonwoven material may be used. If a certain air permeability results due to the configuration, care must of course be taken that the nonwoven material forming the seal nevertheless ensures a seal against entry of any undesirable particles.

A filter cartridge in accordance with the invention may be suitable for installation in a filter housing of the invention. One advantageous embodiment of the inventive concept envisions that the filter cartridge be made of the same material as the seal. This variant is particularly well suited for filter cartridges made of a nonwoven material. For an air-permeable seal, the requirement for adequate particle separation is then met since the separation efficiency corresponds to that of the filter medium. A filter cartridge designed in this way is particularly easy to dispose of since it is produced from a single material. If the selected nonwoven material is made of synthetic resin material (i.e., plastic), such a component is suitable for thermal disposal. In addition, since the employed plastics are identical, it is possible to reuse old filter cartridges in plastics production.

The following are practical embodiments of the filter cartridges. The filter cartridges may be designed as flat filter cartridges in which the filter medium is folded in a zigzag (i.e., pleated) shape. In this case, the end folds of the filter medium can project from the filter cartridge to form the seal. This reduces the number of parts used to construct the filter cartridge and results in an economically efficient filter cartridge production. It is also possible, however, to produce an integral component by deep drawing a nonwoven blank, which simultaneously acts as a seal and as a filter frame. The filter medium is then installed in the frame part of this integral component and connected therewith. This may be accomplished, for instance, by adhesive bonding or thermal welding.

In accordance with another embodiment of the sealing system proposed by the invention, a round filter cartridge may be used. This round cartridge has a star-shaped folded filter medium and is provided with end disks at its end faces. A nonwoven seal having the above-described function can then be mounted to the outer edge of the end disks. A further option is to make the end disks themselves of the nonwoven material, so that the nonwoven seal is integrated in this component. This has the aforementioned advantages that the entire filter cartridge is made of one and the same material.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail with reference to illustrative preferred embodiments shown in the accompanying drawings in which.

DETAILED DESCRIPTION OF PREFERRED EMBODIMENTS

Figure 1:
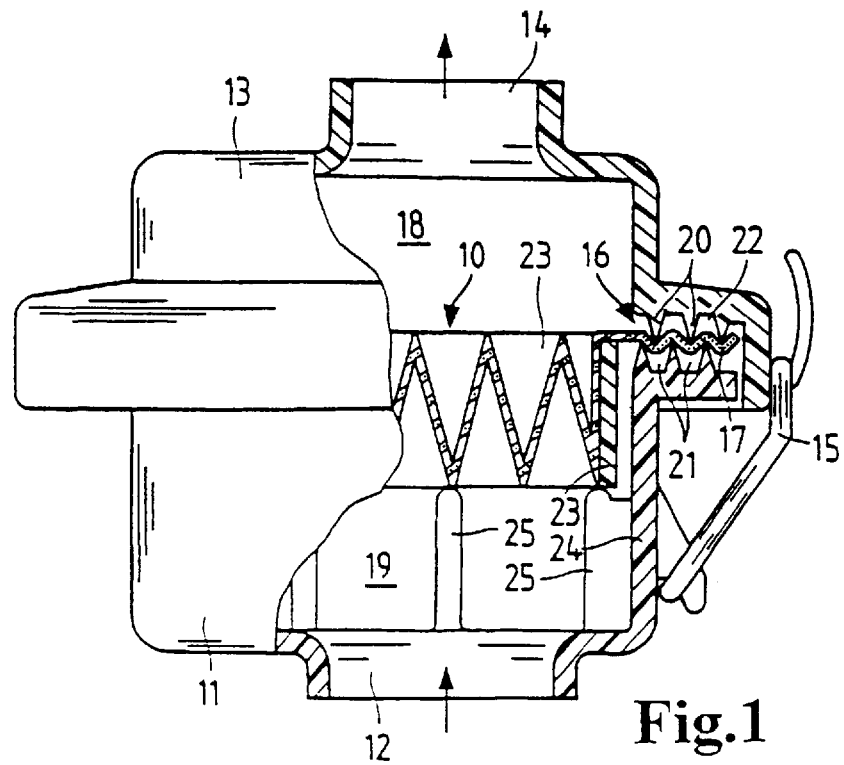
FIG. 1 is a partial section through a filter comprising two housing shells and a flat filter cartridge, wherein the filter cartridge is fixed by a nonwoven seal within the joint of the housing parts.

FIG. 1 shows a filter comprising a housing and a filter cartridge 10. The housing has a housing shell 11 with an inlet 12 and a cover 13 with an outlet 14. The housing parts are firmly connected with one another by a clamping clip 15. A seal 17, which forms part of the filter cartridge 10, is inserted into a joint 16. This separates a filtered side 18 from an unfiltered side 19 of the filter cartridge.

Joint 16 is formed by clamping ribs 20, the gaps of which form clamping grooves 21. Clamping ribs and clamping grooves alternate in such a way that the clamping ribs of the respectively other housing part extend into the clamping grooves. The clamping ribs, however, do not extend all the way to the groove bottom 22 of the corresponding clamping groove.

The filter is assembled by inserting the filter cartridge 10 into the housing shell 11. The filter cartridge is undersized in relation to the housing opening since no seal is required between a filter framework 23 and a wall 24 of the housing shell 11. The filter cartridge 10 can thus be easily inserted loosely into the housing shell and is initially held in its mounting position by ribs 25. The seal 17 overlaps the installation opening in housing shell 11, so that it rests on the joint area. When cover 13 is mounted and clamping clip 15 fastened closed, the seal is deformed by the interaction of clamping ribs 20 and clamping grooves 21, which results in the desired sealing effect.

Figure 2:
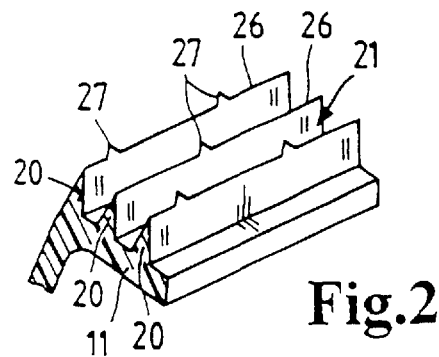
FIG. 2 is a perspective view of the clamping ribs, which are provided with teeth to fix the seal, as used in a housing according to FIG. 1.

FIG. 2 shows a detail view of the housing shell 11 according to FIG. 1 in the area of the joint, which clearly shows the clamping ribs 20 and clamping grooves 21. The clamping ribs terminate in pressure edges 26, which are provided with regularly spaced teeth 27 to fix the seals.

Figure 3:
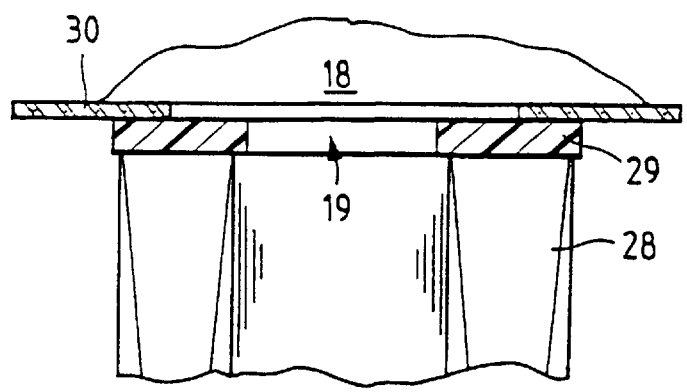
FIG. 3 is a longitudinal section through a round filter cartridge with end disks and a nonwoven seal attached by adhesive bonding.

FIG. 3 shows the filter cartridge according to the invention in the form of a round filter cartridge. A star-shaped folded filter medium 28 is provided with foil end disks 29 at its end faces. A seal between the unfiltered side 19 and the filtered side 18 of the cartridge through which the medium preferably flows from the outside toward the inside is provided in the area of the depicted foil end disk 29 by a nonwoven ring 30, which has a larger diameter than the filter cartridge. Thus, the outer area of seal ring 30, e.g., corresponding to the sealing system described in FIG. 1, can be clamped between two housing parts (not shown).

Figure 4:
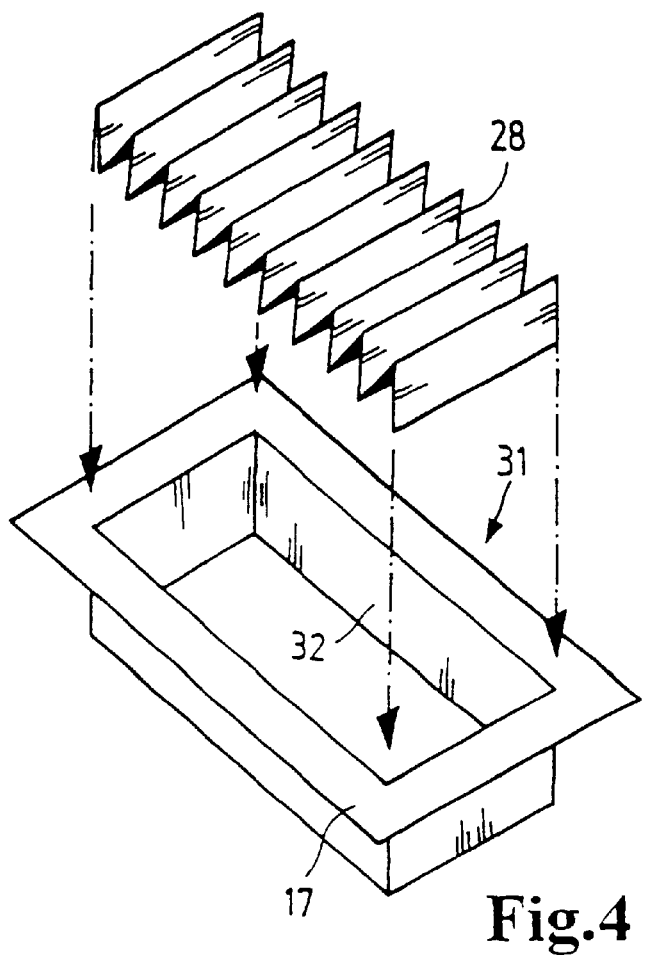
FIG. 4 shows a flat filter cartridge made of a nonwoven material with a deep drawn filter frame, which simultaneously acts as a seal.
Figure 5:
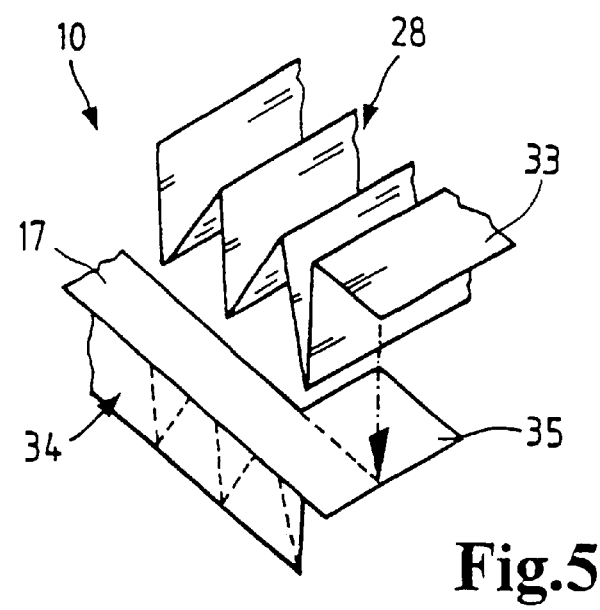
FIG. 5 shows a flat filter cartridge made of a nonwoven material, in which the end fold of the filter medium is used as the nonwoven seal.

The flat filter cartridges shown in FIGS. 4 and 5 are suitable for installation in a housing according to FIG. 1. The two filters are made exclusively of a nonwoven material of synthetic fibers. The filter medium 28 consists of a nonwoven strip folded in zig-zag shape (i.e., pleated). According to FIG. 4, the filter medium is inserted into integral component 31, which is produced by deep drawing, in the direction of the arrows and is thermally welded or adhesively bonded. The integral component is made of the same material as the filter medium. It can thus take part in the filtration process, which increases the effective filter area (this also applies to the variant depicted in FIG. 5). The integral component 31 has a flat area, which acts as seal 17 and a deep drawn area, which acts as a filter frame 32. The filter frame 32 primarily seals the edge of the end face of filter medium 28. The entire filter cartridge is thus made of two parts.

In the embodiment of filter cartridge 10 according to FIG. 5, an end fold 33 of the filter medium is flipped up to form the seal of the filter cartridge. The end face edges of the filter medium are bonded to a side strip 34, which is also flipped up to form a seal 17. At the end of the side strip 34 a flap 35 is provided to connect seal 17 with end fold 33, which is also provided as a seal.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A filter comprising a housing shell and a cover, said shell and cover fixing a filter cartridge interiorly of the housing such that the filter cartridge separates an unfiltered side provided with a housing inlet from a filtered side provided with a housing outlet, wherein a seal at least partially made of a flat material deformable by mounting forces of the cover on the shell is arranged on the filter cartridge such that it extends into a joint between the housing shell and the cover so as to seal said joint, said seal being pressed into at least one clamping groove provided in one of the shell and cover by at least one clamping rib formed on the other of the shell and cover and extending substantially parallel to the housing wall, said at least one clamping rib having a pressure edge in contact with one side of the seal, and the opposite side of the seal in the area of the pressure edge projecting into a hollow space formed by the clamping groove, said clamping groove being sufficiently deep that the seal does not touch the groove bottom.

2. A filter according to claim 1, wherein said filter is an air filter for combustion air of an internal combustion engine.

3. A filter according to claim 1, wherein a plurality of clamping ribs and grooves are provided, and the clamping grooves are formed by the gaps between the clamping ribs.

4. A filter according to claim 1, wherein the pressure edges are provided with means for securing the seal in position.

5. A filter according to claim 4, wherein said means for securing comprise teeth.

6. A filter according to claim 1, wherein the seal simultaneously fixes the filter cartridge within the housing interior.

7. A filter according to claim 1, wherein the seal is made of a fibrous nonwoven material.

8. A filter according to claim 7, wherein said fibrous material is a thermoplastic material.

9. A filter cartridge for installation in a filter according to claim 1, wherein a seal of the filter cartridge within a tolerance range always contacts the pressure edges of the clamping ribs within a joint of the filter housing, irrespective of any shape deviations of the filter housing.

10. A filter cartridge according to claim 9, wherein said cartridge comprises a filter medium made of the same material as said seal.

11. A filter cartridge according to claim 10, wherein said filter medium is a pleated strip of filter material, and said seal is partly formed of end folds of the pleated filter medium strip.

12. A filter cartridge according to claim 9, wherein the seal is part of an integral component produced in a deep drawing process, which is used as a filter frame into which the filter medium is introduced.

13. A filter cartridge according to claim 9, wherein the seal is mounted to the outer circumference of an end disk, which together with a star-shaped folded filter medium forms a round filter cartridge.

14. A filter cartridge according to claim 13, wherein the seal forms a single integral part with an end disk of the filter cartridge.

* * * * *